United States Patent [19]

Mon

[11] Patent Number: 4,602,510
[45] Date of Patent: Jul. 29, 1986

[54] FLUIDIC ROTATIONAL SPEED SENSOR

[75] Inventor: George Mon, Silver Spring, Md.

[73] Assignee: The United States of America as represented by the Secretary of the Army, Washington, D.C.

[21] Appl. No.: 650,475

[22] Filed: Sep. 14, 1984

[51] Int. Cl.⁴ .............................................. G01P 3/26
[52] U.S. Cl. ...................................... 73/506; 73/521; 73/522
[58] Field of Search .......................... 73/506, 521, 522

[56] References Cited

U.S. PATENT DOCUMENTS 3,392,739 7/1968 Taplin et al. .......................... 73/521
3,587,610 6/1971 Langley ................................. 73/506
3,754,471 8/1973 Hohenberg ........................... 73/506

Primary Examiner—Anthony V. Ciarlante
Attorney, Agent, or Firm—Saul Elbaum; Alan J. Kennedy; Anthony T. Lane

[57] ABSTRACT

A device for measuring the rotational speed of a rotating object in which a stream of fluid from a back pressure sensor is directed at a chopper wheel attached to the rotating object. The output of the back pressure sensor varies as the chopper wheel rotates. The number of variations in pressure per unit time is directly proportional to the rotational speed of the rotating object.

6 Claims, 8 Drawing Figures

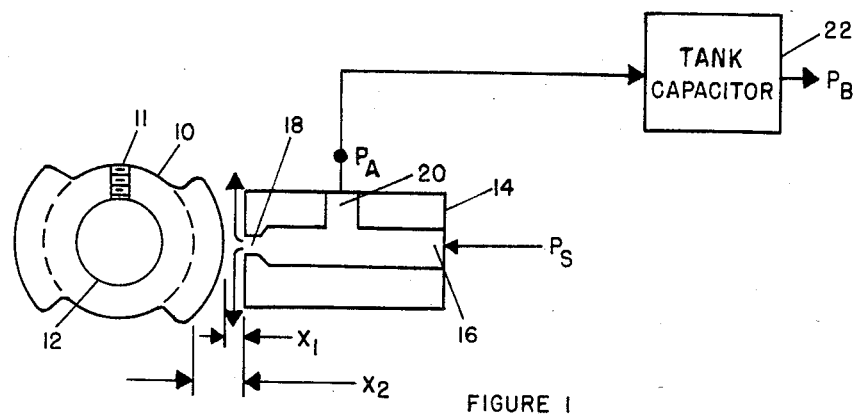
FIGURE 1
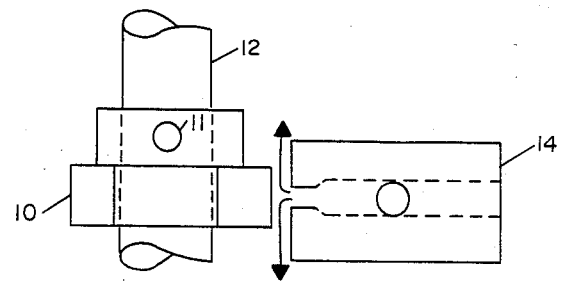
FIGURE 2
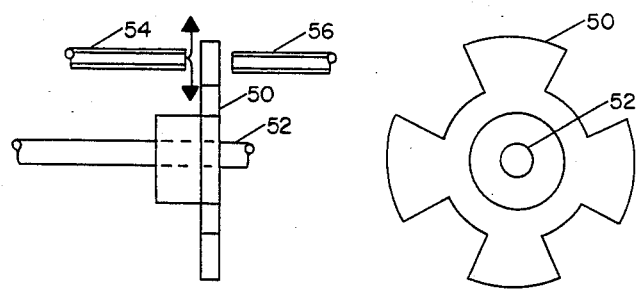
FIGURE 3
PRIOR ART
FIGURE 4
PRIOR ART
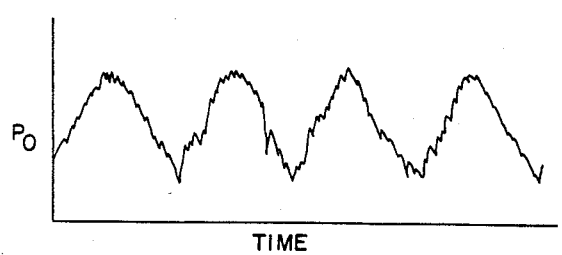
FIGURE 5 PRIOR ART

FLUIDIC ROTATIONAL SPEED SENSOR

RIGHTS OF THE GOVERNMENT

The invention described herein may be manufactured used or licensed by or for the Government of the United States of America for governmental purposes without payment to me of any royalties hereon.

BACKGROUND OF THE INVENTION

Presently existing fluidic rotational speed sensors utilize a toothed chopper wheel attached to a rotating object, such as a rotating shaft. The chopper wheel is placed between a fluid supply jet nozzle and a fluid receiver. As the shaft rotates, the teeth of the chopper wheel periodically interrupt the jet of fluid. This causes the output pressure at the fluid receiver to appear as a pulse train. The number of pulses per unit time is directly proportional to the rotational speed of the shaft. However, this sensor inherently has a very low signal to noise ratio because of the flow noise in the chopper wheel. Its upper speed is also limited because the fluid supply jet can not reconstitute fast enough at high shaft speeds. As a result, it becomes very difficult, if not impossible, to distinguish the signal from the noise.

SUMMARY OF THE INVENTION

The present invention is a device for measuring the rotational speed of a rotating object. A chopper wheel is attached to the rotating object. The chopper wheel has a radius of $r=r_1$, and at least one tooth having a radius of $r=r_2$ where $r_2>r_1$. A back pressure sensor means directs a stream of fluid at the teeth of the chopper wheel. The back pressure sensor means is placed such that the stream of fluid is coplaner with and directed directly at the edge of the chopper wheel.

The gap distance between the chopper wheel and the back pressure sensor means varies as the chopper wheel rotates from a distance of $d=x_1$ to $d=x_2$, and the output pressure, $P_A$, of the back pressure sensor means varies from $P_A=P_{A1}$ to $P_A=P_{A2}$. The output pressure from the back pressure sensor is measured by means such as a pressure transducer.

To filter noise in the output pressure from the back pressure sensor means, a tank capacitor in fluid connection with the output of the back pressure sensor means is used. The output pressure, $P_B$, of the tank capacitor, varies from $P_B=P_{B1}$ to $P_B=P_{B2}$.

OBJECTS OF THE INVENTION

It is an object of the invention to present a fluidic rotational speed sensor in which the number of pressure pulses is directly proportional to the speed of the rotating object.

It is another object to present a fluidic rotational speed sensor which has a high signal to noise ratio.

DESCRIPTION OF THE DRAWINGS

FIG. 1 is an end view of the fluidic rotational speed sensor, including a tank capacitor, with the chopper wheel attached to a rotating shaft.

FIG. 2 is a side view of the fluidic rotational speed sensor illustrated in FIG. 1.

FIG. 3 is a side view of the prior art fluidic rotational speed sensor.

FIG. 4 is an illustration of the chopper wheel used in FIG. 3.

FIG. 5 illustrates the output pressure over time of the fluidic rotational speed sensor shown in FIG. 3.

DESCRIPTION OF THE PREFERRED EMBODIMENT

Figure 6:
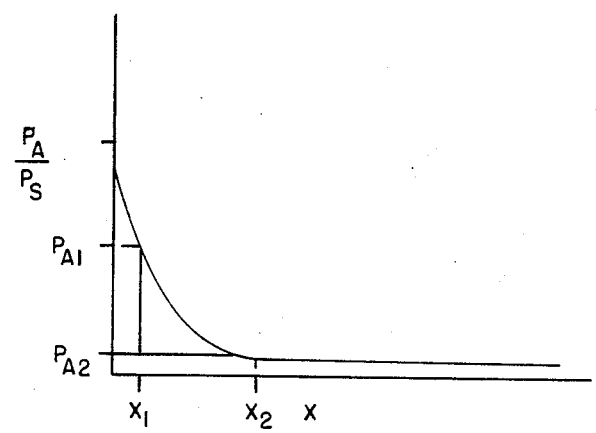
FIG. 6 illustrates normalized output pressure as a function of the gap distance.

The present invention represents an improvement to the prior art fluidic rotational speed sensor. The prior art speed sensor, as illustrated in FIG. 3, comprises a toothed chopper wheel 50 attached to a rotating object which in this figure is a rotating shaft 52. Chopper wheel 50 is placed between a fluid supply jet nozzle 54 and a fluid receiver 56. As shaft 52 rotates, the teeth of chopper wheel 50 periodically interrupts the jet of fluid from fluid supply jet nozzle 54. This causes the output pressure at fluid receiver 56 to appear as a pulse train, as shown in FIG. 5. The number of pulses per unit time is directly proportional to the rotational speed of the shaft. However, this sensor inherently has a very low signal to noise ratio because of the flow noise in the chopper wheel. Its upper speed is also limited, because the fluid supply jet can not reconstitute fast enough at high shaft speeds. As a result, it becomes very difficult, if not impossible, to distinguish the signal from the noise.

In order to overcome these shortcomings, the sensor of the present invention is presented. It comprises a toothed chopper wheel 10 attached to a rotating object, such as shaft 12. Set screw 11 is used to keep chopper wheel 10 firmly attached to shaft 12. The chopper wheel 10 has a radius of $r=r_1$, and at least one tooth having a radius of $r=r_2$, where $r_2>r_1$. A back pressure sensor 14 directs a stream of fluid at the teeth of the chopper wheel. A fluid, such as air, is supplied to the back pressure sensor 14 at pressure $P_s$. The fluid travels through tube 16 to nozzle 18, which directs it to chopper wheel 10. The back pressure sensor 14 is placed such that the stream of fluid is coplaner with and directed directly at the edge of chopper wheel 10. A portion of the fluid exits the back pressure sensor 14 through tube 20. The pressure, $P_A$, of the fluid flowing from tube 20 is the output pressure of the back pressure sensor. The output pressure, $P_A$, is measured by means not illustrated, such as a pressure transducer.

Figure 7:
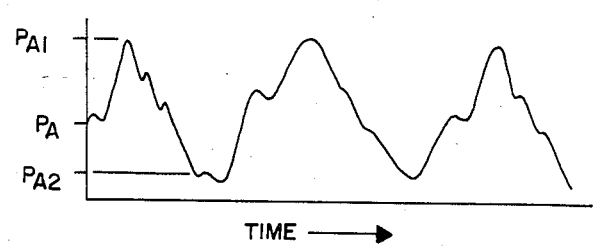
FIG. 7 illustrates the output pressure over time of the fluidic rotational speed sensor shown in FIG. 1, without the tank capacitor.

The gap distance between the chopper wheel 10 and the back pressure sensor 14 varies as the chopper wheel rotates, from a distance of $d=x_1$ to $d=x_2$. For a given supply pressure, $P_s$, to the back pressure sensor, the output pressures, $P_A=P_{A1}$, and $P_A=P_{A2}$, are dependent on the gap distance, d, between the chopper wheel and the back pressure sensor, as shown in FIG. 6. As shaft 12 rotates, the gap distance varies between $x_1$ and $x_2$, and the output pressure changes accordingly. For the chopper wheel shown in FIG. 1, which has only two teeth, there will be two output pulses for each revolution. Therefore, the number of pulses per unit time is directly proportional to the rotational speed of the shaft. FIG. 7 shows a typical plot of the output pressure as a function of time.

Figure 8:
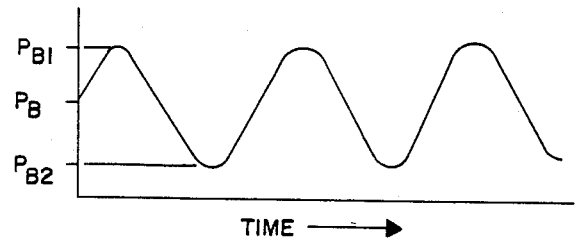
FIG. 8 illustrates the output pressure over time of the fluidic rotational speed sensor shown in FIG. 1, with the tank capacitor.

As may be seen from FIG. 7, the output pressure from the back pressure sensor 14 contains a significant amount of noise. To filter the noise from the output pressure, a tank capacitor 22 is placed in fluid connection with the output of back pressure sensor 14. The output pressure, $P_B$, from the tank capacitor, varies from $P_B=P_{B1}$ to $P_B=P_{B2}$. The output pressure, $P_B$, is measured by means not illustrated, such a pressure transducer. FIG. 8 clearly shows that the tank capacitor effectively filters the noise in the output pressure, and as a result, the output wave form has a very high signal to noise ratio.

While the invention has been described to make reference to the accompanying drawings, I do not wish to be limited to the details shown therein as obvious modifications may be made by one of ordinary skill in the art.

I claim:

1. A device for measuring the rotational speed of a rotary object comprising:
   (a) a chopper wheel attached to a rotating object, said chopper wheel having a radius of $r=r_1$, and at least one tooth having a radius of $r=r_2$, where $r_2>r_1$;
   (b) back pressure sensor means for directing a stream of fluid at the teeth of said chopper wheel;
   (c) A tank capacitor for filtering noise in the output pressure in fluid connection with the output of said back pressure sensor means, wherein said tank capacitor produces an output wave that has a high signal to noise ratio; and
   (d) means for measuring the output pressure from said tank capacitor.

2. The device of claim 1 wherein said back pressure sensor means is placed such that the stream of fluid is coplaner with and directed directly at the teeth of said chopper wheel.

3. The device of claim 2 wherein the gap distance between said chopper wheel and said back pressure sensor means varies as the chopper wheel rotates from a distance of $d=x_1$ to $d=x_2$, and the output pressure, $P_B$, of the tank capacitor, varies from $P_B=P_{B1}$ to $P_B=P_{B2}$.

4. The device of claim 3 wherein said means for measuring the output pressure from said tank capacitor is pressure transducer.

5. The device of claim 2 wherein said back pressure sensor means comprises a source of fluid that is directed through a tube to a nozzle that directs said fluid to said chopper wheel.

6. The device of claim 5 wherein a portion of said fluid within said back pressure sensor is fed through a port to said tank capacitor to filter said noise in said output pressure.

* * * * *